United States Patent [19]

Peil

[11] Patent Number: 4,947,556

[45] Date of Patent: Aug. 14, 1990

[54] PLUMBER'S LEVEL

[76] Inventor: Todd F. Peil, 868 Winterberry Ct., Woodbury, Minn. 55125

[21] Appl. No.: 473,057

[22] Filed: Jan. 31, 1990

[51] Int. Cl.$^5$ ............................................. G01C 9/28
[52] U.S. Cl. ...................................... 33/370; 33/382; 33/367; 33/371; 138/104
[58] Field of Search .................. 33/370, 371, 333, 347, 33/365, 367, 334, 375, 377, 379, 381, 382, 384, 389, 390, 353, 372, 373, 343, 351, 354; 138/104

[56] References Cited

U.S. PATENT DOCUMENTS

| | | |
|---|---|---|
| 331,144 | 11/1885 | Lawler . |
| 991,446 | 5/1911 | Johnson . |
| 1,502,255 | 7/1924 | Lemieux . |
| 1,605,604 | 11/1926 | Nerbon . |
| 2,251,640 | 8/1941 | Skrainka . |
| 2,452,930 | 11/1948 | Ivey ........................................ 33/370 |
| 2,789,363 | 4/1957 | Miley ...................................... 33/347 |
| 3,820,249 | 6/1974 | Stone . |
| 3,832,782 | 9/1974 | Johnson et al. ......................... 33/351 |
| 4,126,944 | 11/1978 | Burkhart . |
| 4,164,817 | 8/1979 | Walker .................................. 33/371 |
| 4,394,799 | 7/1983 | Moree et al. ........................... 33/371 |
| 4,402,141 | 9/1983 | Sterrenberg ........................... 33/370 |
| 4,589,213 | 5/1986 | Woodward ............................ 33/343 |
| 4,593,475 | 6/1986 | Mayes .................................... 33/347 |
| 4,663,856 | 5/1987 | Hall et al. .............................. 33/381 |
| 4,829,676 | 5/1989 | Waldron ................................ 33/381 |
| 4,888,880 | 12/1989 | Parker ................................... 33/371 |

OTHER PUBLICATIONS

Popular Mechanics, Magnetic Level Model A23 Dec. 1964, p. 34, vol. 122, No. 6.

Primary Examiner—William A. Cuchlinski, Jr.
Assistant Examiner—Christopher W. Fulton
Attorney, Agent, or Firm—Haugen and Nikolai

[57] ABSTRACT

A spirit level assembly attachable to a free end of a pipe section being installed includes a housing block of generally rectangular cross-section in which a series of viewing ports are formed through opposed side walls thereof. Fitted into each of the viewing ports is a spirit level vial or bubble. Integrally formed on the opposed ends of the housing block are cylindrical stubs of predetermined diameter corresponding to commonly encountered pipe sizes. The stubs are threaded in accordance with the National Pipe Thread convention. When the housing is screwed onto the length of pipe being leveled or plumbed, an appropriate bubble vial can be viewed to establish the desired horizontal or vertical orientation of that pipe segment.

6 Claims, 1 Drawing Sheet

PLUMBER'S LEVEL

BACKGROUND OF THE INVENTION

1. Field of the Invention:

This invention relates generally to a device for leveling and plumbing pipe runs during installation of water and gas lines, and more particularly to a spirit level device which is readily attachable to the free end of a water or gas pipe to facilitate the leveling and plumbing thereof.

2. Discussion of the Prior Art:

When installing piping within a building which is to be suspended a predetermined distance beneath the ceiling rafters, it is desirable that the pipe runs be leveled as they are installed. Likewise, in dropping a pipe run vertically, it is desired that it extend perpendicular to the horizontal, i.e., that it be plumb. U.S. Pat. No. 4,593,475 to Daniel J. Mayes describes a plumber's tool specially designed for use with pipes and rods wherein three spirit levels are set in a web-like frame, each of the spirit levels comprising a sealed tube or vial containing a liquid and a gas bubble. The frame has one or more reference edges and the three vials are respectively positioned parallel to, perpendicular with and at an angle to that reference edge. The level of the Mayes patent is provided with a longitudinal arcuate groove in the reference edge so that it can readily be positioned on and will conform to the outer circumference of the pipe being leveled or plumbed. Moreover, it is equipped with a strip of magnetic material whereby the level can be made to adhere to the pipe, provided the pipe is made from a magnetizable material.

SUMMARY OF THE INVENTION

The present invention is deemed to be an improvement over the type of plumber's level described in the aforereferenced Mayes patent. More particularly, it is configured to more positively engage the piping being leveled or plumbed than can be achieved using only a strip of magnetic material Then, too, the device of the present invention is not limited to use with pipe's that are magnetizable, e.g., iron or steel pipes, but may also be used with non-ferrous pipes such as copper and aluminum tubes.

The plumber's level of the present invention comprises a housing block having a longitudinal axis and a plurality of viewing ports formed in one or both side surface(s) thereof, the block being of a predetermined length and having first and second opposed ends. Integrally formed with at least one end of the housing block is a cylindrical stub that has an outer diameter and is threaded in accordance with the American Standard for Pipe Threads or some other accepted convention. A liquid-filled bulb-type spirit level bubble is disposed in each of the plurality of viewing ports where the bulb in one of the ports is parallel to the longitudinal axis, the bulb in another viewing port being perpendicular to the longitudinal axis. Others may be at predetermined angles other than 0 degrees and 90 degrees. Because of the threaded end on the housing block, the level may be readily screwed into a pipe fitting at the end of a length of pipe being installed to effectively become an extension thereof. By observing the appropriate bubble in the spirit level, the plumber can accurately level or plumb that pipe section. By providing a series of concentric threaded stubs on the end of the housing block, the level may be made to accommodate various standard pipe sizes and thread pitches.

It is accordingly a principal object of the present invention to provide a useful tool for leveling and plumbing piping as it is being installed in a building.

Another object of the invention is to provide a spirit level which may be readily attached to the end of pipe section to thereby free up the plumber's hands as suspension straps or the like are adjusted to provide a level run.

A yet further object of the invention is to provide a plumber's level having a series of threaded stubs on one or both ends of a block-like housing where the stubs are of differing outer diameter and provided with threads conforming to an industrial standards for pipe sizes and threads whereby the level can be used with a variety of pipe types generally encountered.

The foregoing features, objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 1:
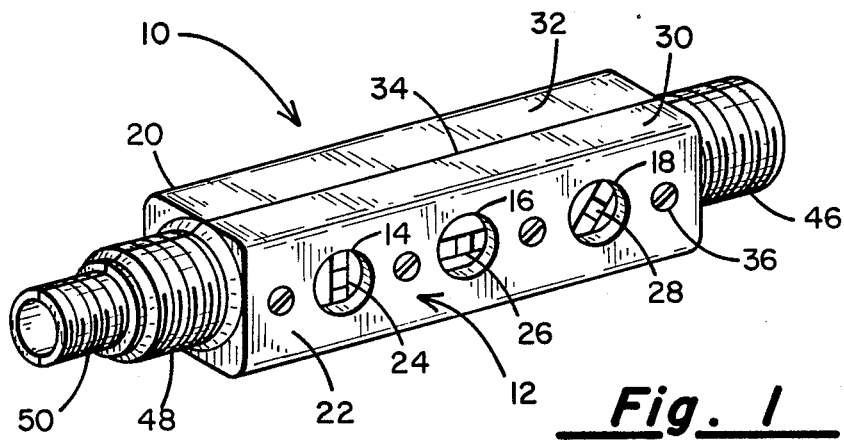
FIG. 1 is a perspective view of a plumber's level in accordance with the present invention.
Figure 2:
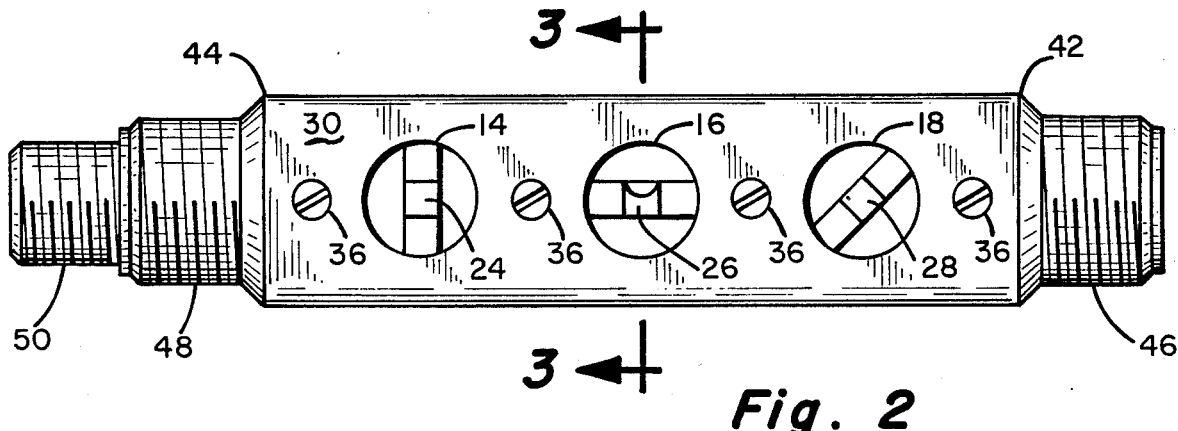
FIG. 2 is a side elevation of the plumber's level.

Referring first to FIG. 1, the plumber's level in accordance with the preferred embodiment of the invention is identified generally by numeral 10 and is seen to include a spirit level housing block 12 having a plurality of viewing ports or windows 14, 16 and 18 formed in the opposed side surfaces 20 and 22 thereof. The housing block 12 may be fabricated from a variety of materials including metals and plastics with molded plastic being preferred.

Appropriately clamped within the housing block 12 so as to be visible through the viewing ports 14, 16 and 18 are spirit level vials 24, 26 and 28. Each of these vials comprises a transparent tube filled with a liquid and containing a bubble of air. The longitudinal axis of the vial 24 is oriented perpendicular to the longitudinal axis of the block housing 12 while the vial 26 has its longitudinal axis parallel to the longitudinal axis of the block housing. Vial 28 may be at a predetermined angle with respect to the longitudinal axis of the block housing 12, e.g., 45 degrees.

Figure 3:
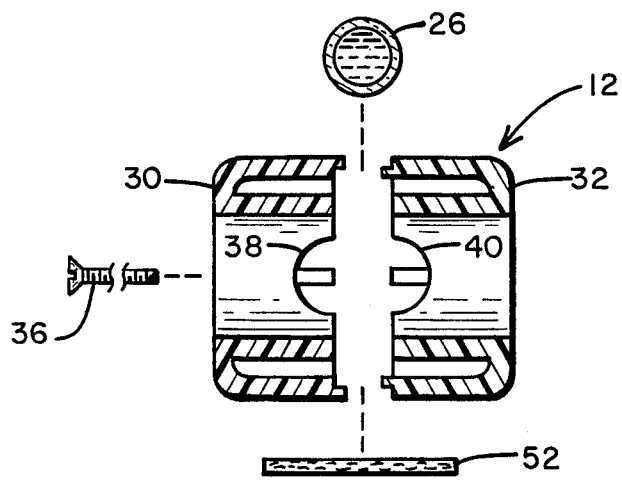
FIG. 3 is a cross-sectional view taken along the line 3—3 in FIG. 2.

With reference to FIGS. 1 and 3, the block housing when molded from plastic or metal may comprise two separable halves 30 and 32 which are adapted to fit together along a longitudinal median parting line 34 and to be held together by fasteners as at 36. In this way, the transparent vials comprising the three spirit levels 24, 26, and 28 may be fitted into semi-circular recesses 38–40 formed in the respective housing halves 30 and 32 so that when the two halves are brought together and fastened, the vials are held firmly in place in a location visible through the viewing windows 14, 16 and 18.

The opposed ends of the housing block 12 are identified by numerals 42 and 44 and integrally formed to the end portion 42 is a cylindrical stub 46 having a predetermined outside diameter which is provided with threads in accordance with the American Standard for Pipe Threads (ASA B2.1-1945). Thus, for example, the stub 46 may be dimensioned and threaded to fit a 1" NPT (National Pipe Tapered) fitting.

Formed on the end 44 of the housing block 12 are a pair of stubs 48 and 50 which are concentrically disposed with respect to one another and with the central longitudinal axis of the housing block. The stub segment 48 has an outside diameter which is greater than the outside diameter of the stub segment 50. Again, the outside diameter of each of these two stubs is in accordance with a standard pipe size such as referenced above and each is provided with threads conforming to that standard By way of example, the stub 50 may be a ½" NPT whereas stub 48 may be a ¾" NPT.

It will be appreciated, then, that the level 10 can be fitted onto pipes of 1" diameter using the threaded stub 46 or can be affixed to a ½" or ¾" pipe fitting using one or the other of stubs 50 and 48. In any event, the block housing assembly 10 when attached to the end of the pipe to be aligned will constitute a colinear extension of that particular pipe segment. Assuming that it is desired to level a horizontally extending run, the plumber will view the spirit level 26 in viewing port 16 and will adjust the free end of the pipe segment being installed until the bubble of the spirit level falls between the two centering marks on the vial visible through viewing port 16. If a vertically oriented pipe run is to be plumbed, with the level assembly 10 fitted into the free end of the pipe, it will be angled until the bubble of the spirit level 24 is disposed between the two centering lines formed on that vial.

If the leveling device comprising the preferred embodiment is to be used with non-threaded pipe, it may be advantageous to affix either a magnetic strip or a double-sided adhesive strip, such as strip 52 in FIG. 3 to either the top or bottom surface of the housing block 12 as in the aforereferenced Mayes patent. Moreover, it may be desirable to provide a arcuate indentation in the bottom surface of the housing block 12 to allow it to better ride on the round exterior surface of a pipe.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A plumber's level for aligning vertical and horizontal runs of piping comprising:
    (a) a housing block having first and second ends, a longitudinal axis and a plurality of viewing ports formed in at least one side surface thereof;
    (b) at least one cylindrical stub formed at said first end, said stub having an outer diameter of a predetermined size and being threaded in accordance with a standard convention; and
    (c) a liquid filled tubular vial spirit level bubble disposed in each of said plurality of viewing ports, said vial in one of said ports being parallel to said longitudinal axis and the vial in another of said viewing ports being perpendicular to said longitudinal axis.

2. The plumber's level as in claim 1 and further including a second cylindrical stub formed at said second end, said stub having an outer diameter different from that of said one stub and threaded in accordance with a standard convention.

3. The plumber's level as in claim 2 and further including a third cylindrical stub formed coaxially with said second stub, said third stub having an outer diameter different from that of said one stub and less than that of said second stub and threaded in accordance with a standard convention.

4. The plumber's level as in claim 1 wherein said housing block has a generally rectangular cross-section.

5. The plumber's level as in claim 4 wherein said housing block includes first and second half sections joined together along a medial plane.

6. The plumber's level as in claim 5 wherein each of said half sections includes a pair of semicircular internal recesses disposed on diametrically opposite sides of said viewing ports for receiving said vials therein such that when said half sections are joined together, said vials are captured.

* * * * *